US012566995B2

(12) United States Patent
Zhang et al.

(10) Patent No.: US 12,566,995 B2
(45) Date of Patent: Mar. 3, 2026

(54) METHOD FOR ESTABLISHING DEFECT DETECTION MODEL AND ELECTRONIC APPARATUS

(71) Applicant: Wistron Corporation, New Taipei City (TW)

(72) Inventors: Jia-Hong Zhang, New Taipei City (TW); Shih-Yi Chao, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 1176 days.

(21) Appl. No.: 17/500,946

(22) Filed: Oct. 14, 2021

(65) Prior Publication Data

US 2023/0066499 A1 Mar. 2, 2023

(30) Foreign Application Priority Data

Aug. 27, 2021 (TW) ................................. 110131889

(51) Int. Cl.
*G06N 20/00* (2019.01)
*G10L 25/27* (2013.01)
(Continued)

(52) U.S. Cl.
CPC .............. *G06N 20/00* (2019.01); *G10L 25/27* (2013.01); *H04R 29/008* (2013.01); *G06Q 10/06395* (2013.01)

(58) Field of Classification Search
CPC ...... G06N 20/00; G10L 25/27; H04R 29/008; G06Q 10/06395
See application file for complete search history.

(56) References Cited

U.S. PATENT DOCUMENTS 10,827,023 B1* 11/2020 Yan ........................ H04L 67/535
2012/0071356 A1* 3/2012 Allikmets ............ G01N 33/564
506/16

(Continued)

FOREIGN PATENT DOCUMENTS

CN 106017954 10/2016
CN 106404388 2/2017
(Continued)

OTHER PUBLICATIONS

"Office Action of India Counterpart Application", issued on Apr. 10, 2023, p. 1-p. 6.

(Continued)

*Primary Examiner* — David E Choi
(74) *Attorney, Agent, or Firm* — JCIPRNET

(57) ABSTRACT

A method for establishing a defect detection model and an electronic apparatus are provided. A first classification model is established based on a training sample set including a plurality of training samples. The training samples are respectively input to the first classification model to obtain a classification result of each training sample. A plurality of outlier samples that are classified incorrectly are obtained from the training samples based on the classification result. A part of outlier samples that are classified incorrectly is deleted from the training samples, and the remaining training samples are used as an optimal sample set. A second classification model is established based on the optimal sample set so as to perform a defect detection through the second classification model.

17 Claims, 3 Drawing Sheets

(51) Int. Cl.
    H04R 29/00     (2006.01)
    G06Q 10/0639     (2023.01)

(56)           References Cited

U.S. PATENT DOCUMENTS

| | | | |
|---|---|---|---|
| 2020/0151578 | A1 | 5/2020 | Chen et al. |
| 2021/0142038 | A1* | 5/2021 | Hsiung ................ G01N 21/253 |
| 2021/0357750 | A1* | 11/2021 | Mummadi ............ G06F 18/251 |
| 2022/0129712 | A1* | 4/2022 | Sallee ................... G06N 3/045 |

FOREIGN PATENT DOCUMENTS

| | | | |
|---|---|---|---|
| CN | 108471949 | A | 8/2018 |
| CN | 106323452 | | 3/2019 |
| CN | 112990375 | | 6/2021 |
| EP | 3678058 | | 7/2020 |
| SG | 11202002326 | R | 4/2020 |
| TW | I448978 | | 8/2014 |
| TW | I694341 | | 5/2020 |
| WO | 2017074505 | A1 | 5/2017 |

OTHER PUBLICATIONS

"Office Action of Taiwan Counterpart Application", issued on Mar. 28, 2022, p. 1-p. 7.

* cited by examiner

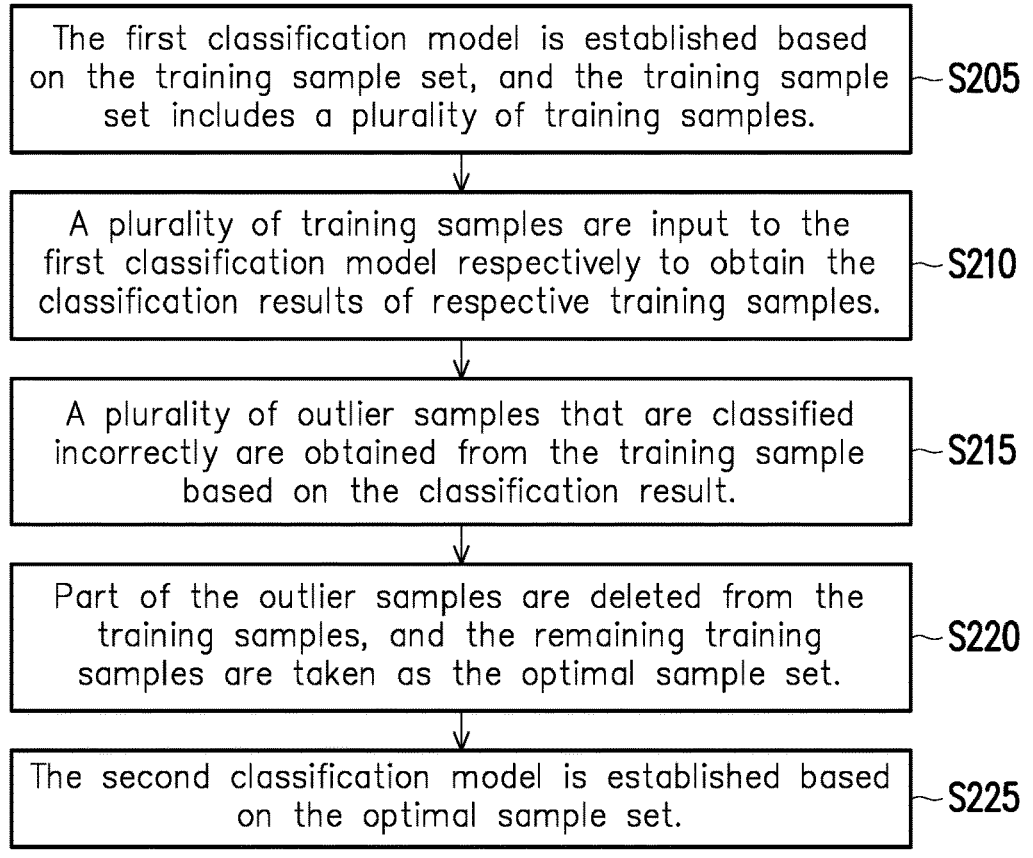

The first classification model is established based on the training sample set, and the training sample set includes a plurality of training samples. ~S205

A plurality of training samples are input to the first classification model respectively to obtain the classification results of respective training samples. ~S210

A plurality of outlier samples that are classified incorrectly are obtained from the training sample based on the classification result. ~S215

Part of the outlier samples are deleted from the training samples, and the remaining training samples are taken as the optimal sample set. ~S220

The second classification model is established based on the optimal sample set. ~S225

FIG. 2

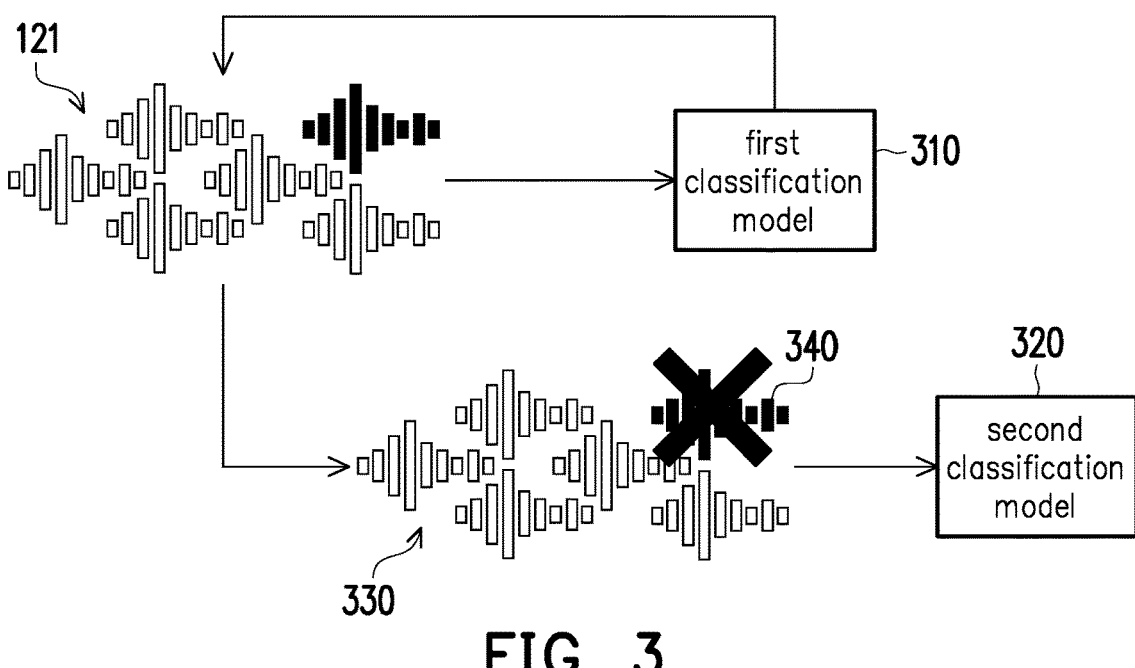

121 first classification model ~310

340

320

330 second classification model

FIG. 3

METHOD FOR ESTABLISHING DEFECT DETECTION MODEL AND ELECTRONIC APPARATUS

CROSS-REFERENCE TO RELATED APPLICATION

This application claims the priority benefit of Taiwan application serial no. 110131889, filed on Aug. 27, 2021. The entirety of the above-mentioned patent application is hereby incorporated by reference herein and made a part of this specification.

BACKGROUND

Field of the Disclosure

The disclosure relates to a model training mechanism, and particularly relates to a method for establishing a defect detection model for quality control and an electronic apparatus.

Description of Related Art

Nowadays, in the product quality inspection process on the production line, due to the variety of quality control standards and a lack of systematic process, the product quality inspection often causes increase in the cost of incoming quality control (IQC) operations at the downstream of the production line due to human factors.

In the existing assembly process of sound components, the acoustic expert (commonly known as the golden ear) makes judgment on the sound components first, then the judgment is made by machine, so that the leak rate is 0.1% or less. That is, after the sound components are assembled, the inspector inspects the product by detecting the sound of all sound components with his/her ear in an anechoic room (or soundproof room). Generally speaking, the leak rate of the judgment made by means of human ears is about 1~1.5%. The leak rate is calculated as the number of defective components/total number of components×100%. After the detection is completed by means of human ears, the machine is then used to inspect the voiceprint, frequency response curve of sound pressure level (SPL), impedance (IMP) and other indexes. Therefore, the current product assembly process involves human ear inspection and machine inspection.

However, golden ear is not easily cultivated. Moreover, the personnel's standards for making marks at the production line are inconsistent, and personnel's fatigue causes inconsistency in inspection quality. In addition, the data marking is not aligned, which makes it difficult for the identification model to verify the accuracy. Currently, the marking process for factory acoustic data is performed by triggering the device to make sounds through human, and then marking is carried out by human ear. However, in such approach, due to the inconsistency of the position and angle of the sound component and the strength of triggering, even if the hearing is maintained at the same level, it is still possible that the marking result is erroneous (different). Furthermore, it is difficult to cultivate an expert with golden ear, plus the personnel's standards for making marks at the production line are inconsistent, and personnel's fatigue causes inconsistency in inspection quality. Moreover, experts with golden ear are not capable of making marks or further judgment on digital audio files.

SUMMARY OF THE DISCLOSURE

The disclosure provides a method for establishing a defect detection model and an electronic apparatus, which adopts a two-stage model establishment method to improve the accuracy of final output of the model.

The method for establishing a defect detection model of the disclosure includes: establishing a first classification model based on a training sample set, the training sample set includes a plurality of training samples; and inputting the training samples into the first classification model respectively to obtain the classification results of the respective training samples; obtaining a plurality of outlier samples that are classified incorrectly from the training samples based on the classification result; deleting part of outlier samples that are classified incorrectly from the training samples, and using the remaining training samples as an optimal sample set; and establishing a second classification model based on the optimal sample set, so as to perform a defect detection through the second classification model.

In an embodiment of the disclosure, the training samples are each marked with a positive sample label or a negative sample label, and the classification result includes a first score corresponding to the positive sample label and a second score corresponding to the negative sample label. The step of obtaining the outlier samples that are classified incorrectly from the training samples based on the classification result includes: determining whether each of the training samples is classified incorrectly based on the classification result; determining the training samples marked with the positive sample label and having the second score greater than the first score in the classification result as the outlier samples that are classified incorrectly; and determining the training samples marked with the negative sample label and having the first score greater than the second score in the classification result as the outlier samples that are classified incorrectly.

In an embodiment of the disclosure, after determining whether each of the training samples is classified incorrectly, the method further includes: classifying the training samples marked with a positive sample label and having the second score greater than first score in the classification result into the first error group; and classifying the training samples marked with a negative sample label and having the first score greater than the second score in the classification result into the second error group. The step of deleting part of the outlier samples that are incorrectly classified from the training sample includes: sorting the outlier samples included in the first error group based on the second score, and deleting a specified proportion of outlier samples from the first error group in the order from high score to low score after sorting; and sorting the outlier samples included in the second error group based on the first score, and deleting a specified proportion of outlier samples from the second error group in the order from high score to low score after sorting.

In an embodiment of the disclosure, the training samples are each marked with a positive sample label or a negative sample label, and the classification result includes a first score corresponding to the positive sample label and a second score corresponding to the negative sample label. The step of deleting a part of the outlier samples that are incorrectly classified from the training samples includes: deleting the outlier sample marked with a positive sample label and having the second score greater than a preset threshold; and deleting the outlier sample marked with a negative sample label and having the first score greater than the preset threshold.

In an embodiment of the disclosure, the step of establishing the first classification model based on the training sample set includes: using contrastive learning to train the first classification model, and the contrastive learning includes the following steps: (a1) taking training samples marked with a positive sample label and training samples marked with a negative sample label randomly from the training sample set; (a2) performing similarity comparison on the training samples taken in step (a1), thereby adjusting the parameters of the first classification model; and (a3) repeating the above steps (a1) and (a2) until the accuracy of the first classification model in classifying the training samples is higher than a specified value.

In an embodiment of the disclosure, in step (a1), the number of training sample marked with a positive sample label is one or two, and the number of training sample marked with a negative sample label is one.

In an embodiment of the disclosure, the step of establishing the second classification model based on the optimal sample set includes: using contrastive learning to train the second classification model, and the contrastive learning includes the following steps: (b1) taking training samples marked with a positive sample label and training samples marked with a negative sample label randomly from the optimal sample set; (b2) performing similarity comparison on the training samples taken in step (b1), thereby adjusting the parameters of the second classification model; and (b3) repeating the above steps (b1) and (b2) until the leak rate of the second classification model in classifying the training sample is less than or equal to a specified ratio (for example, 0.1).

In an embodiment of the disclosure, in step (1), the number of training sample marked with a positive sample label is one or two, and the number of training sample marked with a negative sample label is one.

In an embodiment of the disclosure, each training sample is a spectrogram, and the method for establishing the defect detection model further includes: collecting a plurality of audio signals, each of the audio signals has been marked with a positive sample label or a negative sample label; performing Fourier transform on each of the audio signals; and converting the audio signals after undergoing Fourier transform into a spectrogram, and adding the spectrogram and its corresponding positive sample label or negative sample label to the training sample set.

In an embodiment of the disclosure, the method for establishing the defect detection model further includes: performing data augmentation processing on each of the spectrograms in the training sample set.

In an embodiment of the disclosure, after the second classification model is established, the method further includes: receiving a recorded audio file; converting the recorded audio file into a spectrogram; inputting the spectrogram into the second classification model to obtain a prediction result, thereby determining whether there is abnormal sound in the recorded audio file; and outputting a report to a user interface based on the prediction result.

The electronic apparatus of the disclosure includes: a storage device including a training sample set and a plurality of modules. The training sample set includes a plurality of training samples; and a processor, coupled to the storage device, and configured to execute the module to perform the following operations: establishing a first classification model based on the training sample set; inputting the training samples into the first classification model respectively to obtain the classification results of the respective training samples; obtaining a plurality of outlier samples that are classified incorrectly from the training samples based on the classification results; deleting part of the outlier samples that are classified incorrectly from the training samples, and using the remaining training samples as the optimal sample set; and establishing a second classification model based on the optimal sample set to perform a defect detection based on the second classification model.

Based on the above, the disclosure adopts two-stage training to delete outlier data, thereby improving the accuracy of the second classification model in defect detection.

BRIEF DESCRIPTION OF THE DRAWINGS

FIG. 2 is a flowchart of a method for establishing a defect detection model according to an embodiment of the disclosure.
FIG. 3 is a schematic diagram showing a two-stage model establishment method according to an embodiment of the disclosure.

DESCRIPTION OF EMBODIMENTS

Figure 1:
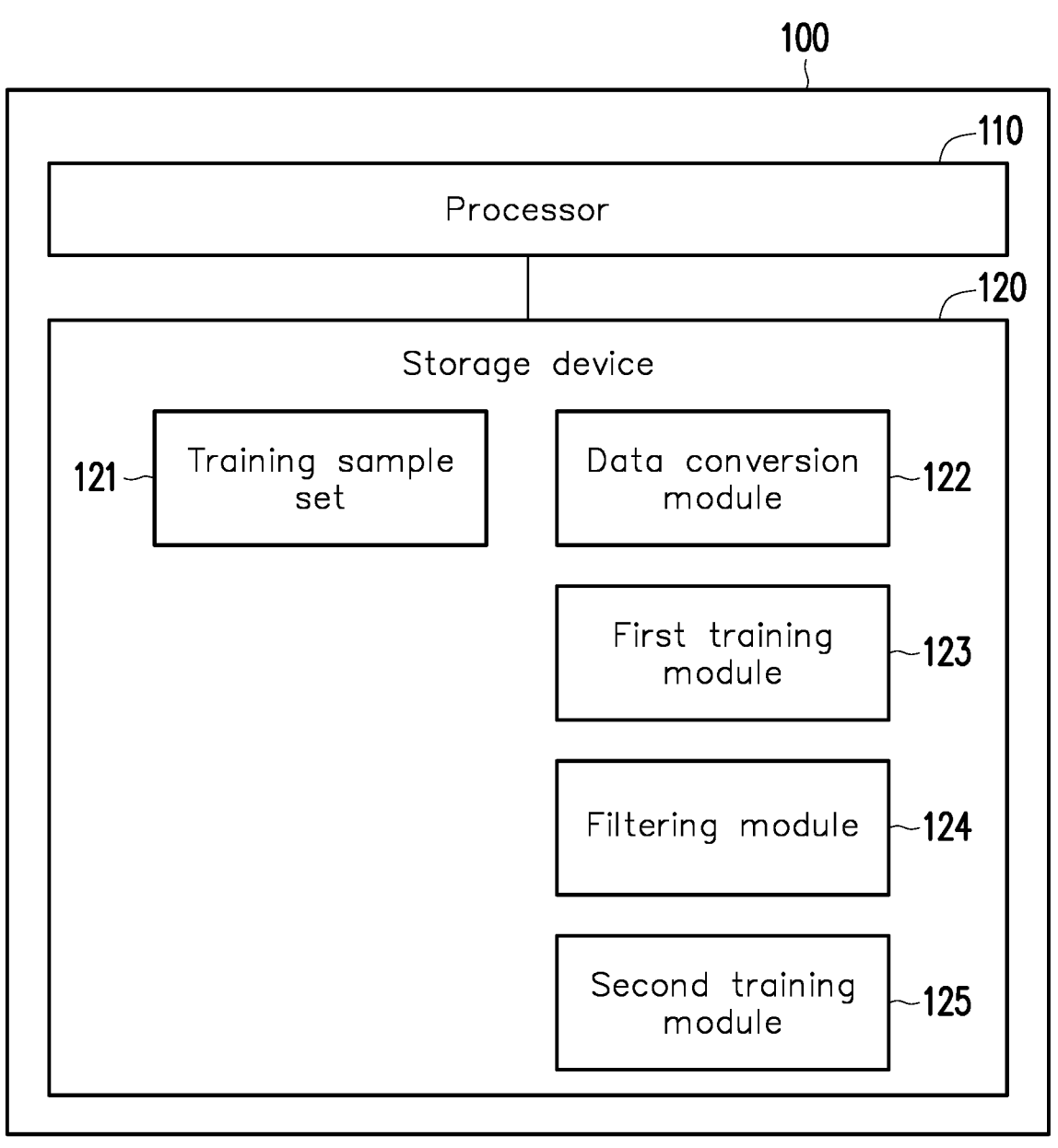
FIG. 1 is a block diagram of an electronic apparatus according to an embodiment of the disclosure.

FIG. 1 is a block diagram of an electronic apparatus according to an embodiment of the disclosure. Please refer to FIG. 1, the electronic apparatus 100 includes a processor 110 and a storage device 120. The processor 110 is coupled to the storage device 120. Here, the electronic apparatus 100 is configured to establish a classification model to classify the recorded audio files.

The processor 110 is, for example, a central processing unit (CPU), a graphics processing unit (GPU), or other programmable microprocessors, a digital signal processor (DSP), a programmable controller, an application specific integrated circuit (ASIC), a programmable logic device (PLD) or other similar devices.

The storage device 120 is, for example, any type of fixed or removable random access memory, read-only memory, flash memory, secure digital card, hard disk, or other similar devices or a combination of these devices. The storage device 120 includes a training sample set 121, a data conversion module 122, a first training module 123, a filtering module 124, and a second training module 125. Specifically, the training sample set 121 includes a plurality of training samples, and these training samples are each marked with a positive sample label or a negative sample label. The data conversion module 122, the first training module 123, the filtering module 124, and the second training module 125 are, for example, composed of one or a plurality of code segments. After the code segments are installed, the processor 110 is used for execution to realize the operations of various modules.

The data conversion module 122 is configured to convert the collected data into appropriate training samples. The first training module 123 is configured for using the training sample set 121 to establish a first classification model. The filtering module 124 performs filtering in the training sample set 121 based on the classification result of the trained first classification model, thereby deleting part of the outlier samples to obtain the optimal sample set. The second training module 125 is configured for establishing a second classification model by using the optimal sample set, using the second classification model as the final defect detection model, and performing defect detection by using the final defect detection model.

When being applied to the detection model for acoustic defect detection, the conventional machine learning algorithm often causes loss of many feature values during feature conversion and low generalization of the classification model, resulting in poor classification effects. For example, Mel-Frequency Cepstrum (MFC) causes the loss of many sound features in the process of converting data, which will negatively affect the subsequent execution of the machine learning classifier. Under the condition that many feature values are lost, the learning effect of support vector machine (SVM) is poor. In light of the foregoing, in this embodiment, contrastive learning is adopted to establish the first classification model and the second classification model respectively.

FIG. 2 is a flowchart of a method for establishing a defect detection model according to an embodiment of the disclosure. FIG. 3 is a schematic diagram showing a two-stage model establishment method according to an embodiment of the disclosure. Please refer to FIG. 1 to FIG. 3. First, in step S205, the first training module 123 establishes the first classification model 310 based on the training sample set 121.

Here, the training sample set 121 includes a plurality of training samples, and these training samples are, for example, spectrogram. Before the two-stage model training is carried out, a plurality of audio signals are collected in advance. Each of the collected audio signals has been marked with a positive sample label or a negative sample label. A positive sample label indicates that the audio signal is normal (without noise/abnormal sound), and a negative sample label indicates that the audio signal is abnormal (e.g., with noise/abnormal sound). For example, the human ear can be used first to determine whether the collected audio signal is normal or abnormal, so as to mark each audio signal with a positive sample label or a negative sample label. Alternatively, the plurality of audio signals (without noise) emitted by the plurality of sound components determined as good are marked with a positive sample label, and the plurality of audio signals (with noise) emitted by the plurality of sound components determined as defective are marked with a negative sample label.

In practice, it has been found that if the standards of the training samples are inconsistent, the established model will inevitably fail to achieve the expected effect. Therefore, the step of aligning data standards is added to the data marking process. Two experts with golden ear jointly make the marking results on the same sound component and check whether their marking results are consistent. If their marking results are inconsistent, the experts with golden ear will jointly determine again whether the sound data should be marked with a positive sample label or a negative sample label, and then the sound file data with aligned standard is used for model training.

After obtaining an audio signal with a label (positive sample label or negative sample label), the processor 110 performs multi-Fourier transform on each of the audio signals through the data conversion module 122, and converts the audio signal after undergoing Fourier transform into spectrogram. Thereafter, the spectrogram is used as a training sample and added to the training sample set along with the corresponding positive sample label or negative sample label. Compared with the approach of MFC which results in the loss of many sound features in the process of converting data, the approach of converting audio signals into spectrogram can retain more sound features.

After the audio signals are converted into spectrogram, the data conversion module 122 may further perform data augmentation processing on the spectrogram. Data augmentation processing refers to making different changes randomly to the training sample (spectrogram) before the model is trained, thereby increasing the diversity of the training samples. A picture is rotated, cropped, adjusted, etc. to change its size and proportion, or the picture is offset or flipped, and its brightness or color temperature is changed to obtain a completely different new image. For example, by translating the picture randomly, the target in the picture will move continuously during the training process; by zooming the picture randomly, the picture will zoom in or out continuously. Through the data augmentation process, the existing pictures can be modified and deformed, so that the data is concentrated, and the machine can still learn the important features of the pictures.

Data augmentation can increase the degree of variants of the data set, but the data augmentation cannot be performed excessively. If noise is far more than information, a negative impact will be caused to the training. No matter how the spectrogram is augmented, the spectrogram that was originally marked with a positive sample label or a negative sample label will not change the label status that has been marked. Also, the additional benefit of data augmentation is that it can increase the number of training samples.

In this embodiment, contrastive learning is adopted to train the first classification model 310. Contrastive learning includes the following steps: (a1) taking training samples marked with a positive sample label and training samples marked with a negative sample label randomly from the training sample set 121; (a2) performing similarity comparison on the training samples taken in step (a1), thereby adjusting the parameters of the first classification model 310; and (a3) repeating the above steps (a1) and (a2) until the accuracy of the first classification model 310 in classifying the training samples is higher than a specified value (e.g., 80%). The step (a2) is used to reinforce the difference between the training samples marked with a positive sample label and the training samples marked with a negative sample label.

After the first classification model 310 is trained, in step S210, the plurality of training samples are input to the first classification model 310 respectively to obtain the classification results of various training samples. The classification result includes a first score corresponding to a positive sample label and a second score corresponding to a negative sample label. The first score and the second score respectively represent the probability values of being classified into a positive sample label and a negative sample label, and the sum of the first score and the second score is equal to 1. If the first score is higher than the second score, it means that the corresponding training sample is classified by the first classification model 310 as a positive sample label. If the second score is higher than the first score, it means that the corresponding training sample is classified by the first classification model 310 as a negative sample label.

Next, in step S215, a plurality of outlier samples that are classified incorrectly are obtained from the training sample based on the classification result. Based on the classification result, the filtering module 124 determines whether each of the training samples is classified incorrectly, and thereby regards the training samples that are classified incorrectly by the first classification model 310 as outlier samples. Through the filtering module 124, the training samples marked with a positive sample label and having the second score greater than the first score in the classification result are determined as outlier samples that are classified incorrectly. In addition, through the filtering module 124, the training samples marked with a negative sample label and having the first score greater than the second score in the classification result are determined as outlier samples that are classified incorrectly.

Next, in step S220, part of the outlier samples 340 are deleted from the training samples, and the remaining training samples are taken as the optimal sample set 330. In an embodiment, the filtering module 124 may delete a part of the outlier samples 340 according to a specified proportion. Specifically, after the filtering module 124 determines whether various training samples are classified incorrectly, the filtering module 124 classifies the training samples marked with a positive sample label and having the second score greater than the first score in the classification result into the first error group, and classifies the training samples marked with a negative sample label and having the first score greater than the second score in the classification result into the second error group. Thereafter, the filtering module 124 sorts the outlier samples included in the first error group based on the second score, and deletes a specified proportion of outlier samples from the first error group in the order from high score to low score after sorting. Moreover, the filtering module 124 sorts the outlier samples included in the second error group based on the first score, and deletes a specified proportion of outlier samples from the second error group in the order from high score to low score after sorting.

For example, assuming that the specified ratio is 10%, the positive sample label is "OK", and the negative sample label is "NG". The outlier samples that are marked as "OK" but are incorrectly classified as "NG" are sorted in the order from high score to low score according to the second score corresponding to "NG". Then, the top 10% of outlier samples are deleted. Furthermore, the outlier samples marked as "NG" but incorrectly classified as "OK" are sorted from high score to low score according to the first score corresponding to "OK". Then, the top 10% of outlier samples are deleted.

In another embodiment, the filtering module 124 can also delete part of the outlier samples 340 according to a preset threshold. Specifically, the filtering module 124 deletes the outlier samples marked with a positive sample label and having the second score greater than a preset threshold, and deletes the outlier samples marked with a negative sample label and having the first score greater than the preset threshold. Here, the preset threshold is set to be greater than 0.5 and less than 1.

After the optimal sample set 330 is obtained, in step S225, the second training module 125 establishes the second classification model 320 based on the optimal sample set 330 to perform subsequent defect detection through the second classification model 320. The second classification model 320 is the final defect detection model. In this embodiment, a contrastive learning method is adopted to train the second classification model 320. The contrastive learning method includes the following steps: (b1) taking training samples marked with a positive sample label and training samples marked with a negative sample label randomly from the optimal sample set 330; (b2) performing similarity comparison on the training samples taken in step (b1), thereby adjusting the parameters of the second classification model 320; and (b3) repeating the above steps (b1) and (b2) until the leak rate of the second classification model 320 in classifying the training sample is less than or equal to a specified ratio (for example, 0.1). The step (b2) is used to reinforce the difference between the training samples marked with a positive sample label and the training samples marked with a negative sample label.

Figure 4:
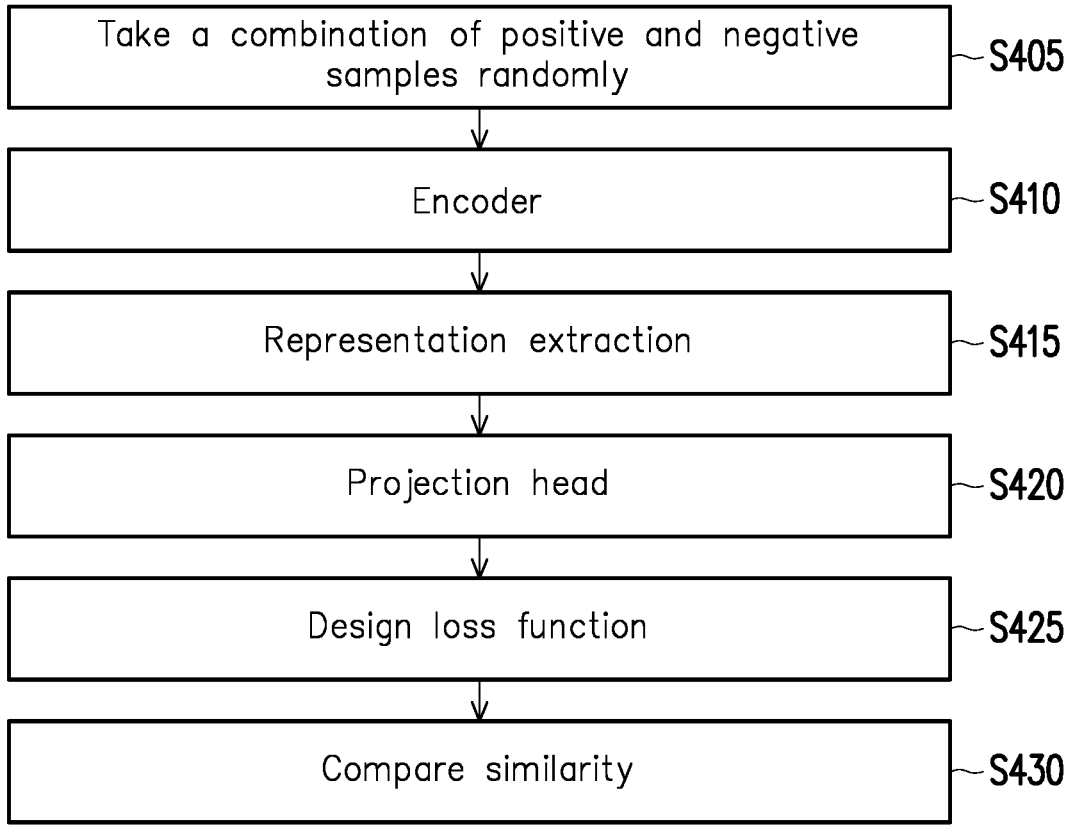
FIG. 4 is a flowchart of contrastive learning according to an embodiment of the disclosure.

FIG. 4 is a flowchart of contrastive learning according to an embodiment of the disclosure. Referring to FIG. 4, in step S405, a combination of positive and negative samples is taken out randomly. That is, training samples marked with a positive sample label and training samples marked with a negative sample label are selected by random sampling for pairing, and the training samples are input to the classifier (first classification model or second classification model) in pairs for training. The main purpose is to allow the classifier to fully learn to identify the difference between positive and negative samples, and the secondary purpose is to balance the number of positive and negative samples to prevent the classifier from being biased due to insufficient negative samples. The number of training sample marked with a positive sample label is one or two, and the number of training sample marked with a negative sample label is one.

Next, in step S410, the selected training samples are input to the encoder to obtain a feature vector. In this embodiment, a convolutional neural network (CNN) encoder is adopted to extract feature vectors from training samples (spectrogram). In other embodiments, the encoder may also be ResNet or VGG19. Since CNN can learn features while projecting features to high dimensions, a more ideal classification accuracy can be achieved.

Then, in step S415, representation extraction is performed to extract the feature vector of the latent space from the feature vector extracted by the encoder.

Thereafter, in step S420, projection head is performed, which is a non-linear projection data process and adopts a fully-connected network. For example, a multi-layer perceptron (MLP) is adopted to convert the feature vector of the latent space obtained in step S415, and the purpose is to amplify (augment) features and maximize the network's ability to identify the same image that has been converted in different ways.

Next, in step S425, a loss function is designed. The design method of the loss function adopts the concept of pulling the positive samples closer and pushing the negative samples farther away. Then, in step S430, similarity comparison is performed. Basically the similarity comparison is carried out by means of dot product method. In the case that one training sample marked with a positive sample label (positive sample) and one training sample marked with a negative sample label (negative sample) are adopted, the similarity between the two is compared. In the case that two positive samples and one negative sample are adopted, it is determined that the similarity between the positive sample A and the positive sample B should be as close as possible, and the similarity between the positive sample A and the negative sample C should be as dissimilar as possible. Through contrastive learning, it is possible to make features of the same type to be more similar, and make features of different types to be less similar. For a more detailed description of the contrastive learning framework, please refer to the SimCLR framework. In an embodiment, the similarity comparison is performed when training the model, and corresponding loss function is calculated. The model parameters are adjusted through the loss function, and the model is continued to be trained, so that the loss function calculated next time becomes gradually smaller. Let the model identify the features of the training samples, and identify that the features of the training samples marked with the positive sample label are not similar to the features of the training samples marked with the negative sample label.

Figure 5:
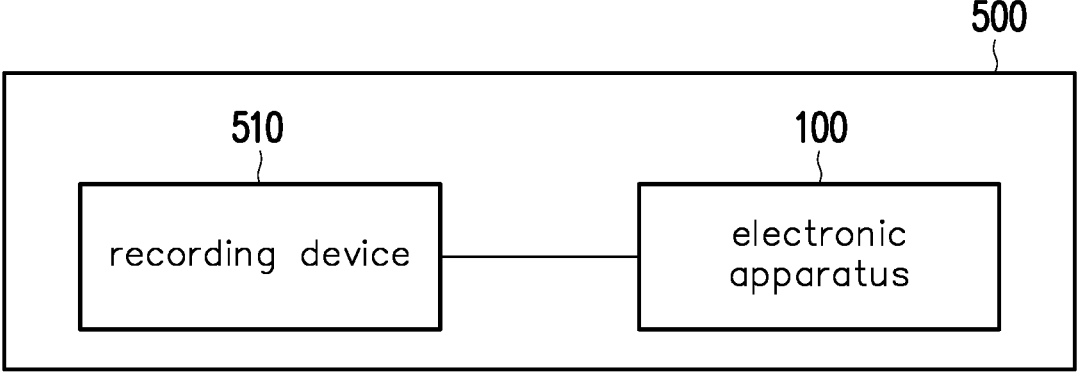
FIG. 5 is a schematic diagram of a machine according to an embodiment of the disclosure.

FIG. 5 is a schematic diagram of a machine according to an embodiment of the disclosure. Please refer to FIG. 5, the machine 500 includes the electronic apparatus 100 and the recording device 510 shown in FIG. 1. A recorded audio file is obtained through the recording device 510, and the recorded audio file is transmitted to the electronic apparatus 100. After receiving the recorded audio files, the electronic apparatus 100 converts the recorded audio files into spectrogram, and performs data augmentation processing and other operations, and then inputs the processed spectrogram to the trained second classification model 320 to obtain prediction results, thereby determining whether there is abnormal sound in the recorded audio file. Moreover, a report is output to the user interface based on the prediction result. The content of report includes the total number of recorded audio files to be detected, the number of misclassification as "NG", the number of correct classification as "NG", the number of misclassification as "OK", the number of correct classification as "OK", leak rate, overkill rate, stability, average detection time, etc.

In summary, the embodiment of the disclosure adopts two-stage training to delete outlier data, thereby improving the accuracy of the second classification model (the final defect detection model) for defect detection. In addition, through contrastive learning and semi-supervised learning training methods combined with spectrogram conversion technology, an artificial intelligence acoustic detection model is established. Compared with conventional detection method by means of human ear, the embodiment of the disclosure establishes an artificial intelligence acoustic detection model, which can significantly reduce the leak rate. Moreover, the artificial intelligence acoustic detection model replaces conventional manpower with process automation, thereby reducing costs of manpower.

What is claimed is:

1. A method of establishing a defect detection model, comprising:

establishing a first classification model based on a training sample set, wherein the training sample set comprises a plurality of training samples, and each of the plurality of training samples is marked with a positive sample label or a negative sample label;

inputting the plurality of training samples into the first classification model respectively to obtain a classification result of each of the training samples, wherein the classification result comprises a first score corresponding to the positive sample label and a second score corresponding to the negative sample label;

obtaining a plurality of outlier samples that are classified incorrectly from the plurality of training samples based on the classification result;

deleting a part of the plurality of outlier samples that are classified incorrectly from the plurality of training samples, and using remaining training samples as an optimal sample set; and establishing a second classification model based on the optimal sample set, so as to perform a defect detection through the second classification model, wherein the step of deleting the part of the plurality of outlier samples that are incorrectly classified from the plurality of training samples comprises:

deleting the outlier sample marked with the positive sample label and having the second score greater than a preset threshold; and deleting the outlier sample marked with the negative sample label and having the first score greater than the preset threshold.

2. A method of establishing a defect detection model, comprising:

establishing a first classification model based on a training sample set, wherein the training sample set comprises a plurality of training samples, and each of the plurality of training samples is marked with a positive sample label or a negative sample label;

inputting the plurality of training samples into the first classification model respectively to obtain a classification result of each of the training samples, wherein the classification result comprises a first score corresponding to the positive sample label and a second score corresponding to the negative sample label;

obtaining a plurality of outlier samples that are classified incorrectly from the plurality of training samples based on the classification result;

deleting a part of the plurality of outlier samples that are classified incorrectly from the plurality of training samples, and using remaining training samples as an optimal sample set; and establishing a second classification model based on the optimal sample set, so as to perform a defect detection through the second classification model, wherein the step of obtaining the plurality of outlier samples that are classified incorrectly from the plurality of training samples based on the classification result comprises:

determining whether each of the plurality of training samples is classified incorrectly based on the classification result;

determining the plurality of training samples marked with the positive sample label and having the second score greater than the first score in the classification result as the plurality of outlier samples that are classified incorrectly; and determining the plurality of training samples marked with the negative sample label and having the first score greater than the second score in the classification result as the plurality of outlier samples that are classified incorrectly.

3. The method of establishing the defect detection model according to claim 2, wherein after determining whether each of the plurality of training samples is classified incorrectly, the method further comprises:

classifying the plurality of training samples marked with the positive sample label and having the second score greater than first score in the classification result into a first error group; and classifying the plurality of training samples marked with the negative sample label and having the first score greater than the second score in the classification result into a second error group;

wherein the step of deleting the part of the plurality of outlier samples that are incorrectly classified from the plurality of training sample comprises:

sorting the plurality of outlier samples comprised in the first error group based on the second score, and deleting a specified proportion of the plurality of outlier samples from the first error group in an order from high score to low score after sorting; and sorting the plurality of outlier samples comprised in the second error group based on the first score, and deleting the specified proportion of the plurality of outlier samples from the second error group in the order from high score to low score after sorting.

4. The method of establishing the defect detection model according to claim 2, wherein the step of establishing the first classification model based on the training sample set comprises:

using a contrastive learning to train the first classification model, wherein the contrastive learning comprises the following steps:

(a1) taking the plurality of training samples marked with a positive sample label and the plurality of training samples marked with a negative sample label randomly from the training sample set;

(a2) performing similarity comparison on the plurality of training samples taken in step (a1), thereby adjusting parameters of the first classification model; and (a3) repeating the above steps (a1) and (a2) until an accuracy of the first classification model in classifying the plurality of training samples is higher than a specified value.

5. The method of establishing the defect detection model according to claim 4, wherein in step (a1), the number of the training sample marked with the positive sample label is one or two, and the number of the training sample marked with the negative sample label is one.

6. The method of establishing the defect detection model according to claim 2, wherein the step of establishing the second classification model based on the optimal sample set comprises:

using a contrastive learning to train the second classification model, wherein the contrastive learning comprises the following steps:

(b1) taking the plurality of training samples marked with a positive sample label and the plurality of training samples marked with a negative sample label randomly from the optimal sample set;

(b2) performing similarity comparison on the plurality of training samples taken in step (b1), thereby adjusting parameters of the second classification model; and (b3) repeating the above steps (b1) and (b2) until a leak rate of the second classification model in classifying the plurality of training sample is less than or equal to a specified ratio.

7. The method of establishing the defect detection model according to claim 6, wherein in step (b1), the number of the training sample marked with the positive sample label is one or two, and the number of the training sample marked with the negative sample label is one.

8. The method of establishing the defect detection model according to claim 2, wherein each of the plurality of training samples is a spectrogram, and the method for establishing the defect detection model further comprises:

collecting a plurality of audio signals, wherein each of the plurality of audio signals has been marked with a positive sample label or a negative sample label;

performing a Fourier transform on each of the plurality of audio signals; and converting each of the plurality of audio signals after undergoing the Fourier transform into the spectrogram, and adding the spectrogram and the corresponding positive sample label or the negative sample label thereof to the training sample set.

9. The method of establishing the defect detection model according to claim 8, further comprising:

performing a data augmentation processing on each of the spectrograms in the training sample set.

10. The method of establishing the defect detection model according to claim 2, wherein after the second classification model is established, the method further comprises:

receiving a recorded audio file;

converting the recorded audio file into a spectrogram;

inputting the spectrogram into the second classification model to obtain a prediction result, thereby determining whether there is abnormal sound in the recorded audio file; and outputting a report to a user interface based on the prediction result.

11. An electronic apparatus, comprising:

a storage device comprising a training sample set and a plurality of modules, wherein the training sample set comprises a plurality of training samples, and each of the plurality of training samples is marked with a positive sample label or a negative sample label; and a processor coupled to the storage device, and configured to execute the module to perform following operations:

establishing a first classification model based on the training sample set;

inputting the plurality of training samples into the first classification model respectively to obtain a classification result of each of the training samples, wherein the classification result comprises a first score corresponding to the positive sample label and a second score corresponding to the negative sample label;

obtaining a plurality of outlier samples that are classified incorrectly from the plurality of training samples based on the classification result;

deleting a part of the plurality of outlier samples that are classified incorrectly from the plurality of training samples, and using remaining training samples as an optimal sample set; and establishing a second classification model based on the optimal sample set to perform a defect detection based on the second classification model, wherein in the operation of deleting the part of the plurality of outlier samples that are incorrectly classified from the plurality of training samples, the processor is configured to:

delete the outlier sample marked with the positive sample label and having the second score greater than a preset threshold; and delete the outlier sample marked with the negative sample label and having the first score greater than the preset threshold.

12. An electronic apparatus, comprising:

a storage device comprising a training sample set and a plurality of modules, wherein the training sample set comprises a plurality of training samples, and each of the plurality of training samples is marked with a positive sample label or a negative sample label; and a processor coupled to the storage device, and configured to execute the module to perform following operations:

establishing a first classification model based on the training sample set;

inputting the plurality of training samples into the first classification model respectively to obtain a classification result of each of the training samples, wherein the classification result comprises a first score corresponding to the positive sample label and a second score corresponding to the negative sample label;

obtaining a plurality of outlier samples that are classified incorrectly from the plurality of training samples based on the classification result;

deleting a part of the plurality of outlier samples that are classified incorrectly from the plurality of training samples, and using remaining training samples as an optimal sample set; and establishing a second classification model based on the optimal sample set to perform a defect detection based on the second classification model, wherein the processor is configured to:

determine whether each of the plurality of training samples is classified incorrectly based on the classification result;

determine the plurality of training samples marked with the positive sample label and having the second score greater than the first score in the classification result as the plurality of outlier samples that are classified incorrectly; and determine the plurality of training samples marked with the negative sample label and having the first score greater than the second score in the classification result as the plurality of outlier samples that are classified incorrectly.

13. The electronic apparatus according to claim 12, wherein the processor is configured to:

classify the plurality of training samples marked with the positive sample label and having the second score greater than first score in the classification result into a first error group;

classify the plurality of training samples marked with the negative sample label and having the first score greater than the second score in the classification result into a second error group;

sort the plurality of outlier samples comprised in the first error group based on the second score, and delete a specified proportion of the plurality of outlier samples from the first error group in an order from high score to low score after sorting; and sort the plurality of outlier samples comprised in the second error group based on the first score, and delete the specified proportion of the plurality of outlier samples from the second error group in the order from high score to low score after sorting.

14. The electronic apparatus according to claim 12, wherein the processor is configured to use a contrastive learning to train the first classification model and the second classification model respectively.

15. The electronic apparatus according to claim 12, wherein each of the plurality of training samples is a spectrogram, and the processor is configured to:

collect a plurality of audio signals, wherein each of the plurality of audio signals has been marked with a positive sample label or a negative sample label;

perform a Fourier transform on each of the plurality of audio signals; and convert each of the plurality of audio signals after undergoing the Fourier transform into the spectrogram, and add the spectrogram and the corresponding positive sample label or the negative sample label thereof to the training sample set.

16. The electronic apparatus according to claim 15, wherein processor is configured to:

perform a data augmentation processing on each of the spectrograms in the training sample set.

17. The electronic apparatus according to claim 12, wherein the processor is configured to:

receive a recorded audio file;

convert the recorded audio file into a spectrogram;

input the spectrogram into the second classification model to obtain a prediction result, thereby determining whether there is abnormal sound in the recorded audio file; and output a report to a user interface based on the prediction result.

* * * * *